United States Patent
Anand et al.

(10) Patent No.: US 9,402,280 B2
(45) Date of Patent: Jul. 26, 2016

(54) METHODS AND APPARATUS FOR RECEIVER ONLY TUNE AWAY IN MULTI-SIM DEVICES

(71) Applicant: QUALCOMM Incorporated, San Diego, CA (US)

(72) Inventors: Raghavendra Shyam Anand, Chickballapur (IN); Parthasarathy Krishnamoorthy, Hyderabad (IN); Rashid Ahmed Akbar Attar, San Diego, CA (US); Jun Hu, San Diego, CA (US); Anand Rajurkar, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 108 days.

(21) Appl. No.: 14/336,523

(22) Filed: Jul. 21, 2014

(65) Prior Publication Data

US 2016/0020819 A1    Jan. 21, 2016

(51) Int. Cl.
| | |
|---|---|
| *H04B 1/50* | (2006.01) |
| *H04W 72/04* | (2009.01) |
| *H04W 88/06* | (2009.01) |
| *H04W 72/08* | (2009.01) |

(Continued)

(52) U.S. Cl.
CPC ............... *H04W 88/06* (2013.01); *H04B 1/406* (2013.01); *H04W 16/14* (2013.01); *H04W 72/0446* (2013.01); *H04W 72/0453* (2013.01); *H04W 72/082* (2013.01)

(58) Field of Classification Search
CPC ............... H04B 1/50; H04W 72/0446; H04W 72/0453; H04W 72/082; H04W 88/06
USPC .................................................. 455/436–444
See application file for complete search history.

(56) References Cited

U.S. PATENT DOCUMENTS

2007/0099614 A1 * 5/2007 Parekh et al. ................. 455/436
2010/0260147 A1   10/2010 Xing et al.

(Continued)

FOREIGN PATENT DOCUMENTS

WO    WO-2014144192    9/2014

OTHER PUBLICATIONS

International Search Report and Written Opinion—PCT/US2015/038085—ISA/EPO—Sep. 18, 2015.

*Primary Examiner* — Sharad Rampuria
(74) *Attorney, Agent, or Firm* — Knobbe Martens Olson & Bear LLP

(57) ABSTRACT

Methods and apparatus for wireless communication are provided. In one aspect, an apparatus for wireless communication comprises a transmitter configured to transmit data at a first frequency on a first radio access technology. The apparatus comprises a receiver configured to receive data at the first frequency on the first radio access technology. The apparatus comprises a processor configured to tune the transmitter to the first frequency associated with the first radio access technology. The processor is configured to tune the receiver from the first frequency to a second frequency associated with a second radio access technology while the transmitter remains tuned to the first frequency associated with the first radio access technology. The processor is further configured erase data to be transmitted for the first radio access technology from at least one transmission channel slot when the first frequency and the second frequency satisfy a predetermined combination of frequencies.

22 Claims, 5 Drawing Sheets

(51) Int. Cl.
*H04B 1/403* (2015.01)
*H04W 16/14* (2009.01)

(56) References Cited

U.S. PATENT DOCUMENTS

| | | |
|---|---|---|
| 2012/0020310 A1 | 1/2012 | Ji et al. |
| 2013/0077540 A1 | 3/2013 | Black et al. |
| 2013/0150111 A1* | 6/2013 | Su et al. .......... 455/515 |
| 2013/0303240 A1 | 11/2013 | Sanka et al. |
| 2013/0329589 A1 | 12/2013 | Cave et al. |
| 2014/0036710 A1 | 2/2014 | Chin et al. |
| 2014/0087785 A1 | 3/2014 | Smadi et al. |
| 2014/0274051 A1* | 9/2014 | Hsu .......... H04W 36/20 455/436 |
| 2015/0264681 A1* | 9/2015 | Vadlamudi .......... H04W 72/0446 455/452.1 |
| 2015/0282057 A1* | 10/2015 | Li .......... H04B 7/0871 455/552.1 |
| 2015/0373671 A1* | 12/2015 | Yang .......... H04W 72/02 455/450 |

\* cited by examiner

METHODS AND APPARATUS FOR RECEIVER ONLY TUNE AWAY IN MULTI-SIM DEVICES

BACKGROUND

1. Field

Certain aspects of the present disclosure generally relate to wireless communication systems, and more particularly, to methods and apparatus for implementing receiver only tune away in multi-subscriber identity module (SIM) devices.

2. Background

In many telecommunication systems, communications networks are used to exchange messages among several interacting spatially-separated devices. In some implementations, a UE may be configured to communicate utilizing more than one communication protocol utilizing more than one radio access technology (RAT). Such devices may be known as multi-SIM devices. When managing the UE's access to more than one RAT, it may become necessary to tune the transmit chain and the receive chain of the UE's transceiver for transmitting and/or receiving, respectively, at frequencies associated with either a first RAT or with a second RAT. Because tuning from transmit and receive frequencies of a first RAT to those of a second RAT conventionally require shutting down both the receive and the transmit operations to the first RAT in order to tune to and engage in communications associated with the second RAT, uplink and downlink throughput may be severely compromised. Accordingly, there is a need for methods and apparatuses for receiver-only tune away in multi-SIM devices.

SUMMARY

Various implementations of systems, methods and devices within the scope of the appended claims each have several aspects, no single one of which is solely responsible for the desirable attributes described herein. Without limiting the scope of the appended claims, some prominent features are described herein.

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale.

One aspect of the disclosure provides an apparatus for wireless communication. The apparatus includes a transmitter configured to transmit data at a first frequency on a first radio access technology. The apparatus comprises a receiver configured to receive data at the first frequency on the first radio access technology. The apparatus comprises a processor configured to tune the transmitter to the first frequency associated with the first radio access technology. The processor is configured to tune the receiver from the first frequency to a second frequency associated with a second radio access technology while the transmitter remains tuned to the first frequency associated with the first radio access technology.

Another aspect of the disclosure provides a method for wireless communication. The method comprises tuning a transmitter of a wireless communication device to a first frequency associated with a first radio access technology. The method comprises tuning a receiver of the wireless communication device from the first frequency associated with the first radio access technology to a second frequency associated with a second radio access technology while the transmitter remains tuned to the first frequency associated with the first radio access technology.

Another aspect of the disclosure provides an apparatus for wireless communication comprising means for transmitting data at a first frequency on a first radio access technology. The apparatus comprises means for receiving data at the first frequency on the first radio access technology. The apparatus comprises means for tuning the means for transmitting to the first frequency associated with the first radio access technology. The apparatus comprises means for tuning the means for receiving from the first frequency to a second frequency associated with a second radio access technology while the means for transmitting remains tuned to the first frequency associated with the first radio access technology.

Another aspect of the disclosure provides a non-transitory computer-readable medium comprising code that, when executed, causes a processor to tune a transmitter of a wireless communication device to a first frequency associated with a first radio access technology. The code, when executed, further causes the processor to tune a receiver of the wireless communication device from the first frequency associated with the first radio access technology to a second frequency associated with a second radio access technology while the transmitter remains tuned to the first frequency associated with the first radio access technology.

DETAILED DESCRIPTION

Figure 1:
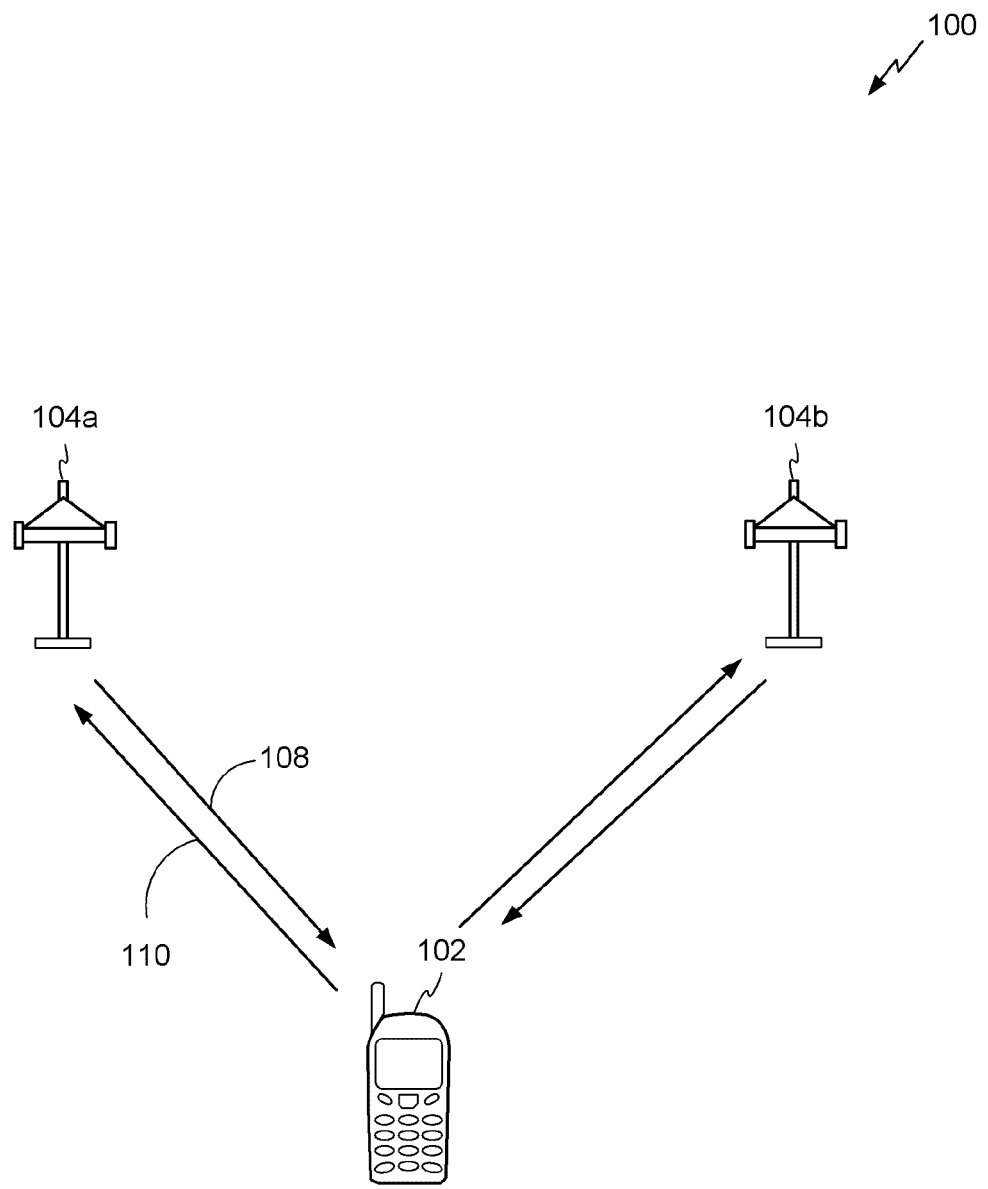
FIG. 1 illustrates an example of a wireless communication system in which aspects of the present disclosure may be employed, according to an implementation.

Various aspects of the novel systems, apparatuses, and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

In some implementations, a wireless local area network (WLAN) includes various devices which are the components that access the wireless network. For example, there can be two types of devices: access points ("APs") and clients (also referred to as stations, or "STAs"). In general, an AP can serve as a hub or base station for the WLAN and a STA serves as a user of the WLAN. For example, a STA can be a laptop computer, a personal digital assistant (PDA), a mobile phone, a wearable computing device (e.g., a watch), an appliance, a sensor, a vending machine, etc. In some implementations a STA can also be used as an AP.

An access point ("AP") can also include, be implemented as, or known as a NodeB, Radio Network Controller ("RNC"), eNodeB, Base Station Controller ("BSC"), Base Transceiver Station ("BTS"), Base Station ("BS"), Transceiver Function ("TF"), Radio Router, Radio Transceiver, or some other terminology.

A station "STA" can also include, be implemented as, or known as an access terminal ("AT"), a subscriber station, a subscriber unit, a mobile station, a remote station, a remote terminal, a user terminal, a user agent, a user device, user equipment, or some other terminology. In some implementations an access terminal can include a cellular telephone, a cordless telephone, a Session Initiation Protocol ("SIP") phone, a wireless local loop ("WLL") station, a personal digital assistant ("PDA"), a handheld device having wireless connection capability, or some other suitable processing device or wireless device connected to a wireless modem. Accordingly, one or more aspects taught herein can be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

FIG. 1 illustrates an example of a wireless communication system 100 in which aspects of the present disclosure can be employed in accordance with an implementation. The wireless communication system 100 can include a first AP 104*a* and a second AP 104*b*. Each of the APs 104*a* and 104*b* may communicate with an STA 102, which may be a multi-SIM device, e.g., may be capable of communicating utilizing more than one radio access technology (RAT). For example, the first AP 104*a* may be configured as a base station associated with a first RAT while the second AP 104*b* may be configured as a base station associated with a second RAT. Although only two APs 104*a* and 104*b* are shown, the present application is not so limited and any number of APs serving any number of RATs may be present.

A variety of processes and methods can be used for transmissions in the wireless communication system 100 between the APs 104*a* and 104*b* and the STA 102. For example, signals can be sent and received in accordance with OFDM/OFDMA techniques. If this is the case, the wireless communication system 100 can be referred to as an OFDM/OFDMA system. Alternatively, signals can be sent and received in accordance with code division multiple access (CDMA) techniques. If this is the case, the wireless communication system 100 can be referred to as a CDMA system.

A communication link that facilitates transmission from an AP to the STA 102 can be referred to as a downlink (DL) 108, and a communication link that facilitates transmission from the STA 102 to an AP can be referred to as an uplink (UL) 110. Alternatively, a downlink 108 can be referred to as a forward link or a forward channel, and an uplink 110 can be referred to as a reverse link or a reverse channel.

The APs 104*a* and 104*b* may act as base stations and provide wireless communication coverage in respective basic service areas (BSAs) (not shown). An AP along with any STAs being served by the AP and/or that use the AP for communication can be referred to as a basic service set (BSS).

Figure 2:
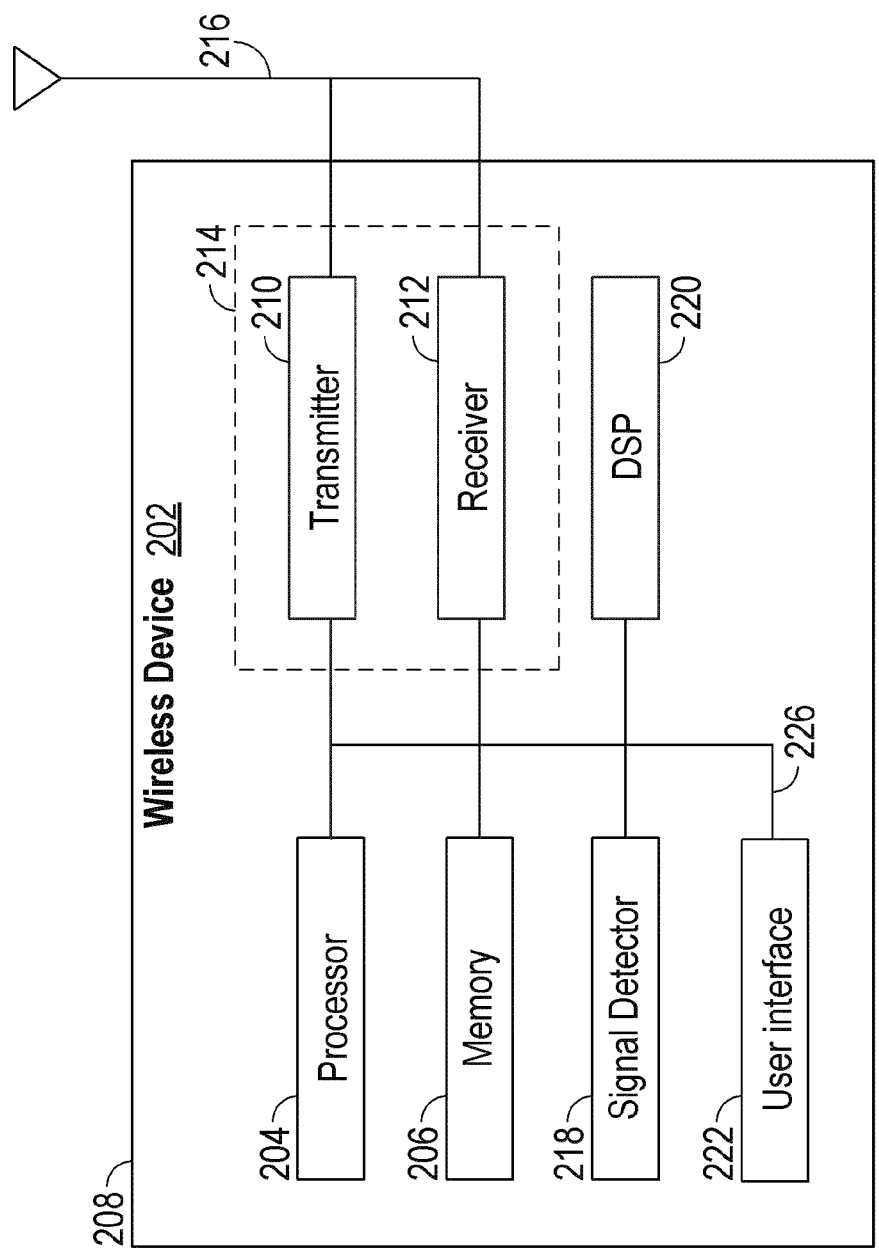
FIG. 2 illustrates various components that may be utilized in a wireless Multi-SIM device that may be employed within the wireless communication system of FIG. 1, according to an implementation.

FIG. 2 illustrates various components that can be utilized in a wireless device 202 that can be employed within the wireless communication system 100 in accordance with an implementation. The wireless device 202 is an example of a wireless device that can be configured to implement the various methods described herein. For example, the wireless device 202 can comprise one of the APs 104*a* and 104*b* or the STA 102.

The wireless device 202 can include a processor 204 which controls operation of the wireless device 202. The processor 204 can also be referred to as a central processing unit (CPU). Memory 206, which can include both read-only memory (ROM) and random access memory (RAM), can provide instructions and data to the processor 204. A portion of the memory 206 can also include non-volatile random access memory (NVRAM). The processor 204 typically performs logical and arithmetic operations based on program instructions stored within the memory 206. The instructions in the memory 206 can be executable to implement the methods described herein.

The processor 204 can comprise or be a component of a processing system implemented with one or more processors. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system can also include machine-readable media for storing software. Software shall be construed broadly to mean any type of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

The wireless device 202 can also include a housing 208 that can include a transmitter 210 and/or a receiver 212 to allow transmission and reception of data between the wireless device 202 and a remote location. The transmitter 210 and receiver 212 can be combined into a transceiver 214. An antenna 216 can be attached to the housing 208 and electrically coupled to the transceiver 214. The wireless device 202 can also include (not shown) multiple transmitters, multiple receivers, multiple transceivers, and/or multiple antennas.

The transmitter 210 can be configured to wirelessly transmit packets having different packet types or functions. For example, the transmitter 210 can be configured to transmit packets of different types generated by the processor 204. When the wireless device 202 is implemented or used as an AP 104 or STA 102, the processor 204 can be configured to process packets of a plurality of different packet types. For example, the processor 204 can be configured to determine the type of packet and to process the packet and/or fields of the packet accordingly.

The receiver 212 can be configured to wirelessly receive packets having different packet types. In some aspects, the receiver 212 can be configured to detect a type of a packet used and to process the packet accordingly.

The wireless device 202 can also include a signal detector 218 that can be used in an effort to detect and quantify the level of signals received by the transceiver 214. The signal detector 218 can detect such signals as total energy, energy per subcarrier per symbol, power spectral density and other signals. The wireless device 202 can also include a digital signal processor (DSP) 220 for use in processing signals. The DSP 220 can be configured to generate a packet for transmission. In some aspects, the packet can comprise a physical layer data unit (PPDU).

The wireless device 202 can further comprise a user interface 222 in some aspects. The user interface 222 can comprise a keypad, a microphone, a speaker, and/or a display. The user interface 222 can include any element or component that conveys information to a user of the wireless device 202 and/or receives input from the user. The wireless device can further comprise a battery (not shown) to power the wireless device.

The various components of the wireless device 202 can be coupled together by a bus system 226. The bus system 226 can include a data bus, for example, as well as a power bus, a control signal bus, and a status signal bus in addition to the data bus. The components of the wireless device 202 can be coupled together or accept or provide inputs to each other using some other mechanism.

Although a number of separate components are illustrated in FIG. 2, one or more of the components can be combined or commonly implemented. For example, the processor 204 can be used to implement not only the functionality described above with respect to the processor 204, but also to implement the functionality described above with respect to the signal detector 218 and/or the DSP 220. Further, each of the components illustrated in FIG. 2 can be implemented using a plurality of separate elements.

In conventional multi-SIM devices having a single radio frequency (RF) chip comprising a single transceiver chain, when one RAT is participating in transmitting data (i.e., in data traffic) each other supported RAT may perform a periodical tune away in order to monitor an associated page according to discontinuous reception cycles (i.e., DRx cycles) for each RAT. During such conventional tune away to one of the other supported RATs, the first RAT shuts down both its transmission and reception chains. Shutting down the transmission and reception chains for the first RAT during this intermittent tune away operation is inefficient for at least the following reasons. The other RAT page monitoring may require the use of only the receive (e.g., Rx) chain of the transceiver. Thus, transmission (e.g., Tx) signaling may conceivably continue uninterrupted in the first RAT (e.g., DATA RAT) during the same time frame. This may be true because the transceiver is capable of independently tuning and controlling the Tx chain and the Rx chain with respective, independent phase locked loops (e.g., PLLs). Utilizing advanced algorithms, such as QBTA for example, such tune away may be performed per page burst, which is of very short duration (e.g., approximately 2 ms). Such unnecessary shutdown of the Tx chain associated with the DATA RAT may result in the base station serving the DATA RAT (e.g., a 3GPP-based base station) downgrading the data served to the UE even after the tune away period. This is at least partly because the base station is not aware of the tune away and interprets the tune away as severely degraded UE channel conditions. The data throughput may further worsen and degrade where the multi-SIM device (e.g., the user equipment or UE) is a transaction switching and transport service (e.g., TSTS) device and/or a quad SIM quad standby (e.g., QSQS) device. Accordingly, the present application offers a solution to the above-stated problems.

Since page reception for any RAT requires the use of only the Rx transceiver chain and since the Rx and Tx chains may be independently tuned based on adjustments to the respective PLLs, during a tune away period, only the Rx PLL may be tuned to the page monitoring RAT while the Tx PLL is not adjusted and active data transfer on the original, first DATA RAT remains continuously active (e.g., the first DATA RAT's PLL is not actively retuned to any frequency, including the frequency corresponding to the first DATA RAT's PLL). Thus, at any given tune away period, the Rx transceiver chain may be tuned to and communicate for a first RAT, whereas the Tx transceiver chain may be tuned to communicate for a second RAT simultaneously in the same RF chip and transceiver. Allowing transmission for the first, DATA RAT may be advantageous for at least the following reasons. The base station may now "listen" to the UE and keep synchronization intact, even during the tune away period. The uplink throughput may improve to a great extent and, under some circumstances, almost match uplink throughput for single SIM devices. Moreover, as will be described in more detail in connection with FIG. 3 below, the first, DATA RAT Tx transceiver chain may be turned off (e.g., blanked) when the page monitoring RAT and the first DATA RAT operate utilizing certain frequency band combinations to avoid possible desense to the tune away RAT.

Figure 3:
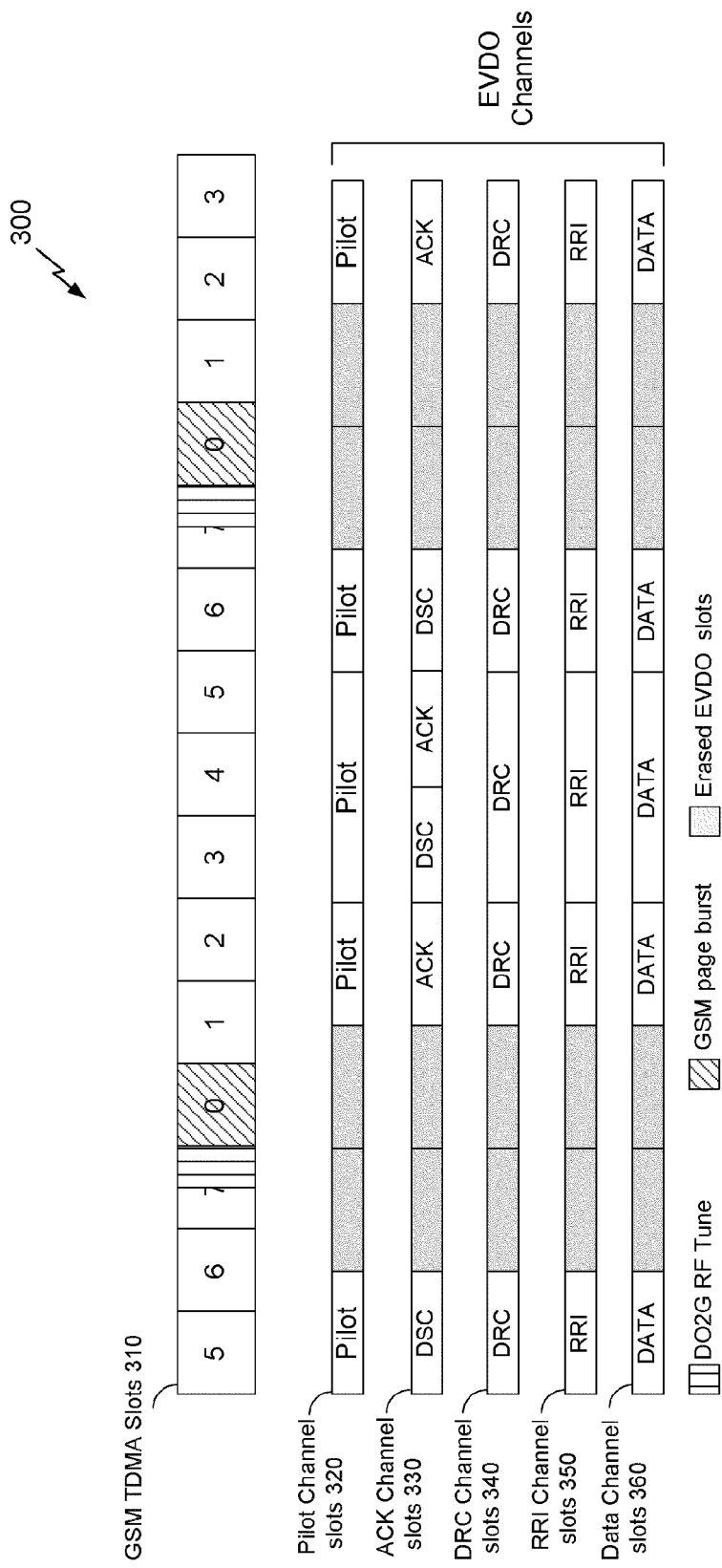
FIG. 3 is an exemplary time sequence diagram showing selective transmission blanking in a wireless Multi-SIM device that may be employed within the wireless communications system of FIG. 1, according to an implementation.

FIG. 3 is an exemplary time sequence diagram 300 showing selective transmission blanking in a wireless Multi-SIM device that may be employed within the wireless communications system of FIG. 1, according to an implementation. The exemplary diagram 300 may correspond to a CDMA+GSM dual SIM dual standby (DSDS) wireless device. However, the present application is not so limited and the implementations described herein may additionally or alternatively apply to any other multi-SIM wireless device. Exemplary diagram 300 shows a plurality of global system for mobile communications (GSM) time division multiple access (TDMA) slots 310 as well as a set of contemporaneous Evolution-Data optimized (EVDO) communication channels. In some implementations, the GSM TDMA slots 310 may correspond to a Rx transceiver chain, which may be tuned away for page reading purposes of a second RAT, for example. In some implementations, the EVDO channels may correspond to a Tx transceiver chain, which may remain active and tuned to a first RAT. Particular slots (or half slots depending on the specific implementation) may be blanked (e.g., erased) where the slots temporally overlap the receiver only tune away operation in the second RAT. Such transmission blanking may be implemented when the Tx frequency and the Rx frequency comprise predetermined frequency band combinations that may cause interference at levels exceeding a predetermined threshold. The EVDO communication channels may comprise a plurality of slots in a pilot channel 320, a plurality of slots in an acknowledge channel 330, a plurality of slots in a data rate control channel 340, a plurality of slots in a reverse rate indicator channel 350, and a plurality of slots in a data channel 360.

As shown, a GSM page burst may occur during one or more slots as shown by the diagonally shaded slots "0." The tune away operation of the second RAT (e.g., GSM TDMA) may occur during a preceding slot, as shown by the vertically shaded slots "1." In some implementations, the frequency band of the GSM RAT and the frequency band of the EVDO channels for the first RAT may be sufficiently close that interference between concurrent transmission and reception would exceed a predetermined interference level threshold. Where such interference (or estimated potential for interference) exceed the predetermined interference level threshold, slots in each of the EVDO channels may be blanked (e.g., erased) such that no transmission occurs during the overlapping slots despite data having been originally scheduled for transmission during the blanked slots. For example, slots in each of the EVDO channels 320, 330, 340, 350 and 360 that overlap with the GSM page burst slots (e.g., slots "0") or that overlap with either the GSM page burst slots or the preceding tune away operation (e.g., slots "0" and slots "7," respectively) may be erased, as represented by slots within each of the EVDO channels 320, 330, 340, 350 and 360 that are grayed out. With QBTA and/or receiver only tune way (ROTA) algorithms, during the tune away period in a CDMA/GSM dual-capability device, only a 1,800 μs gap is observed in the Rx chain, whereas only an 800 μs gap is observed in the Tx chain when Tx blanking is used.

Even though the above example allows for such transmission blanking, the interference between transmissions on the DATA RAT and reception on the tune away RAT may be minimal under most circumstances due to high antenna switch isolation between the transmit and receive transceiver chains. Of course, where there is no band interference (or interference below the predetermined threshold) between DATA Tx RAT and the tune away Rx RAT, transmission blanking may not occur and no erasures of Tx slots will be executed.

Figure 4:
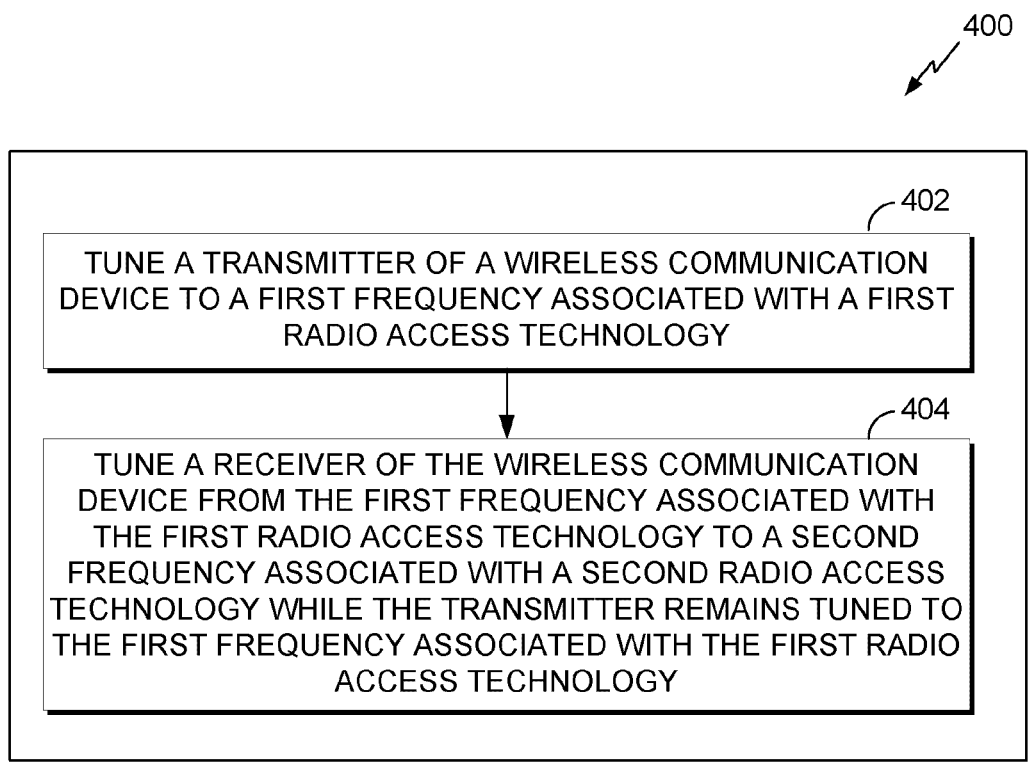
FIG. 4 is a flow chart of an exemplary method for wireless communication, according to an implementation.

FIG. 4 is a flow chart of an exemplary method 400 for wireless communication, according to an implementation. Although the method 400 in FIG. 4 is illustrated in a particular order, in some implementations the blocks herein may be performed in a different order, or omitted, and additional blocks can be added. A person of ordinary skill in the art will appreciate that the process of the illustrated implementation may be implemented in any wireless device that can be configured to process and transmit a generated message.

Operation block 402 includes tuning a transmitter of a wireless communication device to a first frequency associated with a first radio access technology. For example, as previously described, the processor 204 of the wireless device 202 of FIG. 2 may cause the transmitter 210 to be tuned to a first frequency associated with a first radio access technology, such as CDMA corresponding to the EVDO channels 320, 330, 340, 350 and 360 of FIG. 3.

Operation block 404 includes tuning a receiver of the wireless communication device from the first frequency associated with the first radio access technology to a second frequency associated with a second radio access technology while the transmitter remains tuned to the first frequency associated with the first radio access technology. For example, as previously described, the processor 204 of the wireless device 202 of FIG. 2 may cause the receiver 212 to be tuned from the first frequency associated with the first radio access technology, such as CDMA corresponding to the EVDO channels 320, 330, 340, 350 and 360 of FIG. 3 to the second frequency associated with the GSM RAT corresponding to the GSM TDMA slots 310 of FIG. 3. This may be carried out while the transmitter 210 remains active and continuously tuned to the EVDO channels. Thus, in some implementations, the transmitter 210 is not retuned when the receiver 212 is tuned away, even if the retune would have been to the same EVDO channels that the transmitter 210 was tuned to before the receiver tune away.

Figure 5:
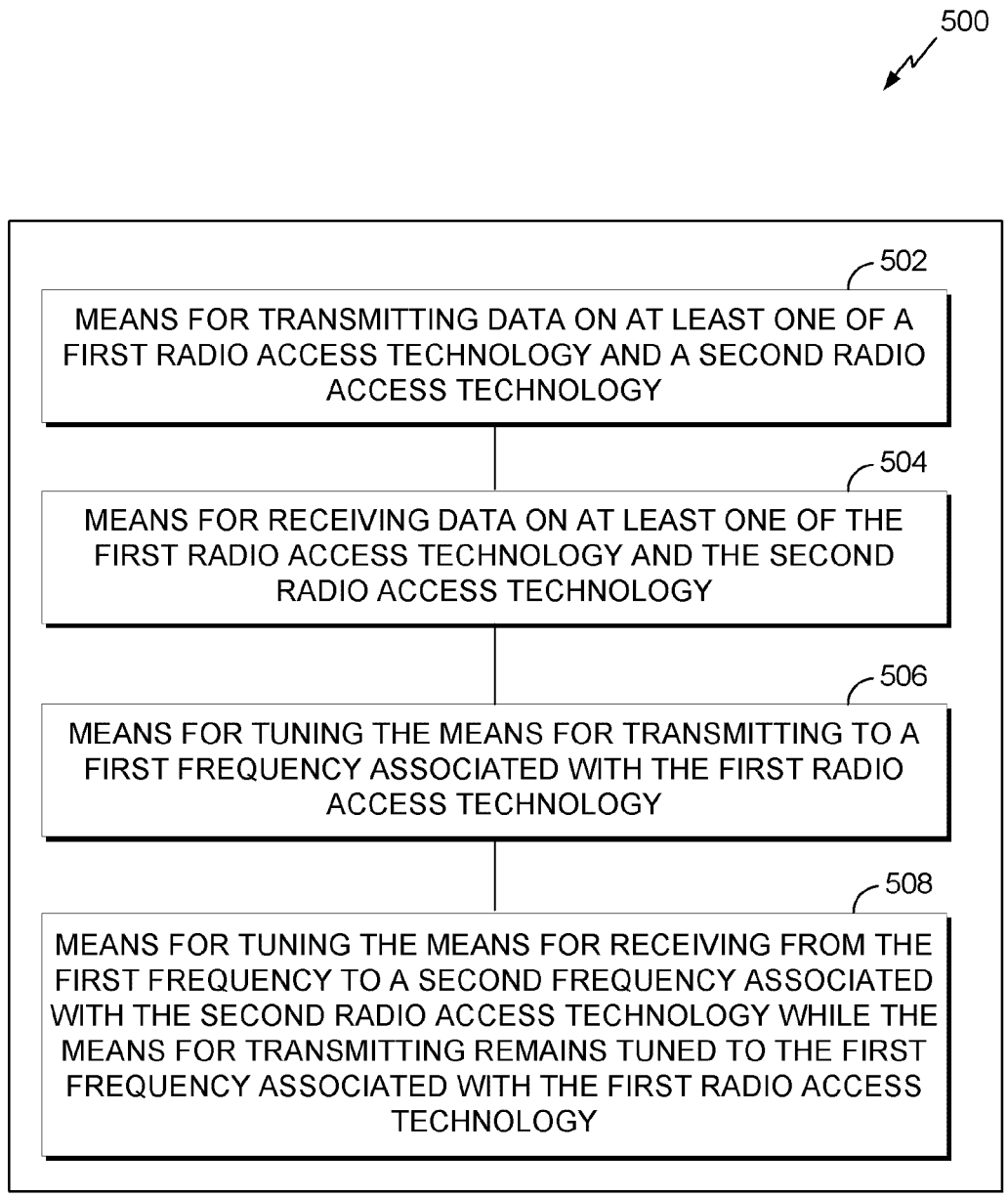
FIG. 5 is a functional block diagram of a wireless Multi-SIM device that can be employed to perform the method of FIG. 4 in the wireless communication system of FIG. 1, according to an implementation.

FIG. 5 is a functional block diagram of an apparatus 500 that can be employed to perform a method 400 of FIG. 4 in the wireless communication system of FIG. 1. Those skilled in the art will appreciate that the apparatus 500 may have more components than the simplified block diagrams shown in FIG. 5. FIG. 5 includes only those components useful for describing some prominent features of implementations within the scope of the claims.

The wireless device 500 includes means 502 for transmitting data at a first frequency on a first radio access technology. In various implementations, means 402 may be implemented by the transmitter 210 of the wireless device 202 of FIG. 2. The wireless device 500 includes means 504 for receiving data at the first frequency on the first radio access technology. In various implementations, means 402 may be implemented by the receiver 212 of the wireless device 202 of FIG. 2.

The wireless device 500 further includes means 506 for tuning the means for transmitting 502 to the first frequency associated with the first radio access technology. In some implementations, means 506 may be configured to perform one or more of the functions described above with respect to operation block 402 of FIG. 4. In various implementations, means 506 may be implemented by the processor 204 or transmitter 210 of the wireless device 202 of FIG. 2.

The wireless device 500 further includes means 508 for tuning the means for receiving 504 from the first frequency to a second frequency associated with a second radio access technology while the means 502 for transmitting remains tuned to the first frequency associated with the first radio access technology. In some implementations, means 508 may be configured to perform one or more of the functions described above with respect to operation block 404 of FIG. 4. In various implementations, means 508 may be implemented by the processor 204 or receiver 212 of the wireless device 202 of FIG. 2.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

In some aspects, wireless signals may be transmitted utilizing various broadband wireless communication systems, including communication systems that are based on an orthogonal multiplexing scheme. Examples of such communication systems include Spatial Division Multiple Access (SDMA), Time Division Multiple Access (TDMA), Orthogonal Frequency Division Multiple Access (OFDMA) systems, Single-Carrier Frequency Division Multiple Access (SC-FDMA) systems, and so forth. An SDMA system may utilize sufficiently different directions to concurrently transmit data belonging to multiple user terminals. A TDMA system may allow multiple user terminals to share the Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein to mean "serving as an example, instance, or illustration." Any implementation described herein as "exemplary" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a web site, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Thus, in some aspects computer readable medium may comprise non-transitory computer readable medium (e.g., tangible media). In addition, in some aspects computer readable medium may comprise transitory computer readable medium (e.g., a signal). Combinations of the above should also be included within the scope of computer-readable media.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

While the foregoing is directed to aspects of the present disclosure, other and further aspects of the disclosure may be devised without departing from the basic scope thereof, and the scope thereof is determined by the claims that follow.

What is claimed is:

1. An apparatus for wireless communication, comprising:
a transmitter configured to transmit data at a first frequency on a first radio access technology;
a receiver configured to receive data at the first frequency on the first radio access technology;
a processor configured to:
tune the transmitter to the first frequency associated with the first radio access technology,
tune the receiver from the first frequency to a second frequency associated with a second radio access technology while the transmitter remains tuned to the first frequency associated with the first radio access technology, and
cause the transmitter to not transmit data for the first radio access technology queued in at least one transmission channel slot based on a condition that transmitting the queued data at the first frequency would cause interference to received data at the second frequency; and
a first phase lock loop associated with the transmitter and a second phase locked loop associated with the receiver, wherein tuning the transmitter comprises tuning the first phase locked loop to the first frequency and tuning the receiver comprises tuning the second phase locked loop from the first frequency to the second frequency.

2. The apparatus of claim 1, wherein the processor is configured to erase data to be transmitted for the first radio access technology from at least one transmission channel slot when the first frequency and the second frequency satisfy a predetermined combination of frequencies.

3. The apparatus of claim 1, wherein the transmitter and the receiver comprise a portion of the same transceiver chain.

4. The apparatus of claim 1, wherein the transmitter and the receiver are disposed on a same radio frequency chip.

5. The apparatus of claim 1, wherein the transmitter remaining tuned to the first frequency does not comprise retuning the transmitter from the first frequency to the first frequency.

6. The apparatus of claim 1, wherein the first radio access technology is different from the second radio access technology.

7. A method for wireless communication, comprising:
tuning a transmitter of a wireless communication device to a first frequency associated with a first radio access technology;
tuning a receiver of the wireless communication device from the first frequency associated with the first radio access technology to a second frequency associated with a second radio access technology while the transmitter remains tuned to the first frequency associated with the first radio access technology; and
not transmitting data for the first radio access technology queued in at least one transmission channel slot based on a condition that transmitting the queued data at the first frequency would cause interference to received data at the second frequency,
wherein tuning the transmitter comprises tuning a first phase locked loop associated with the transmitter to the first frequency and tuning the receiver comprises tuning a second phase locked loop associated with the receiver from the first frequency to the second frequency.

8. The method of claim 7, comprising erasing data to be transmitted for the first radio access technology from at least one transmission channel slot when the first frequency and the second frequency satisfy a predetermined combination of frequencies.

9. The method of claim 7, wherein the transmitter and the receiver comprise a portion of the same transceiver chain.

10. The method of claim 7, wherein the transmitter remaining tuned to the first frequency does not comprise retuning the transmitter from the first frequency to the first frequency.

11. The method of claim 7, wherein the first radio access technology is different from the second radio access technology.

12. An apparatus for wireless communication, comprising:
means for transmitting data at a first frequency on a first radio access technology;
means for receiving data at the first frequency on the first radio access technology;
means for tuning the means for transmitting to the first frequency associated with the first radio access technology;
means for tuning the means for receiving from the first frequency to a second frequency associated with a second radio access technology while the means for transmitting remains tuned to the first frequency associated with the first radio access technology; and
means for not transmitting data for the first radio access technology queued in at least one transmission channel slot based on a condition that transmitting the queued data at the first frequency would cause interference to received data at the second frequency,
wherein the means for tuning the means for transmitting comprises means for tuning a first phase locked loop to the first frequency and the means for tuning the means for receiving comprises means for tuning a second phase locked loop from the first frequency to the second frequency.

13. The apparatus of claim 12, comprising means for erasing data to be transmitted for the first radio access technology from at least one transmission channel slot when transmitting the erased data at the first frequency would cause interference above a predetermined threshold to received data at the second frequency.

14. The apparatus of claim 12, wherein the means for transmitting and the means for receiving comprise a portion of the same transceiver chain.

15. The apparatus of claim 12, wherein the means for transmitting and the means for receiving are disposed on a same radio frequency chip.

16. The apparatus of claim 12, wherein the means for tuning the means for receiving is not configured to retune the means for transmitting from the first frequency to the first frequency.

17. The apparatus of claim 12, wherein the first radio access technology is different from the second radio access technology.

18. A non-transitory computer-readable medium comprising code that, when executed, causes a processor to:
tune a transmitter of a wireless communication device to a first frequency associated with a first radio access technology;
tune a receiver of the wireless communication device from the first frequency associated with the first radio access technology to a second frequency associated with a second radio access technology while the transmitter remains tuned to the first frequency associated with the first radio access technology; and
not transmit data for the first radio access technology queued in at least one transmission channel slot based on a condition that transmitting the queued data at the first frequency would cause interference to received data at the second frequency,
wherein the code, when executed, causes the processor to tune a first phase locked loop associated with the transmitter to the first frequency and tune a second phase locked loop associated with the receiver from the first frequency to the second frequency.

19. The non-transitory computer-readable medium of claim 18, wherein the code, when executed, causes the processor to erase data to be transmitted for the first radio access technology from at least one transmission channel slot when the first frequency and the second frequency satisfy a predetermined combination of frequencies.

20. The non-transitory computer-readable medium of claim 18, wherein the transmitter and the receiver comprise a portion of the same transceiver chain.

21. The non-transitory computer-readable medium of claim 18, wherein the code, when executed, does not cause the processor to retune the transmitter from the first frequency to the first frequency.

22. The non-transitory computer-readable medium of claim 18, wherein the first radio access technology is different from the second radio access technology.

* * * * *